April 8, 1952  H. P. ASKELI  2,592,106
NUTRITION INDICATOR
Filed Nov. 13, 1951

Henry P. Askeli
INVENTOR.

BY
Attorneys

Patented Apr. 8, 1952

2,592,106

UNITED STATES PATENT OFFICE 2,592,106

NUTRITION INDICATOR

Henry P. Askeli, West Yarmouth, Mass.

Application November 13, 1951, Serial No. 255,909

1 Claim. (Cl. 35—74)

This invention relates to new and useful improvements and structural refinements in indicating devices, and the principal object of the invention is to provide a device of the character herein described, which may be conveniently and effectively employed by dietitians and persons on a diet, as well as the public in general, for determining the vitamin and calorie content and acidity and alkalinity content of different types of food.

Some of the advantages of the invention reside in its simplicity of construction, in its accuracy, and in its adaptability to economical manufacture.

With the above more important objects and features in view, and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
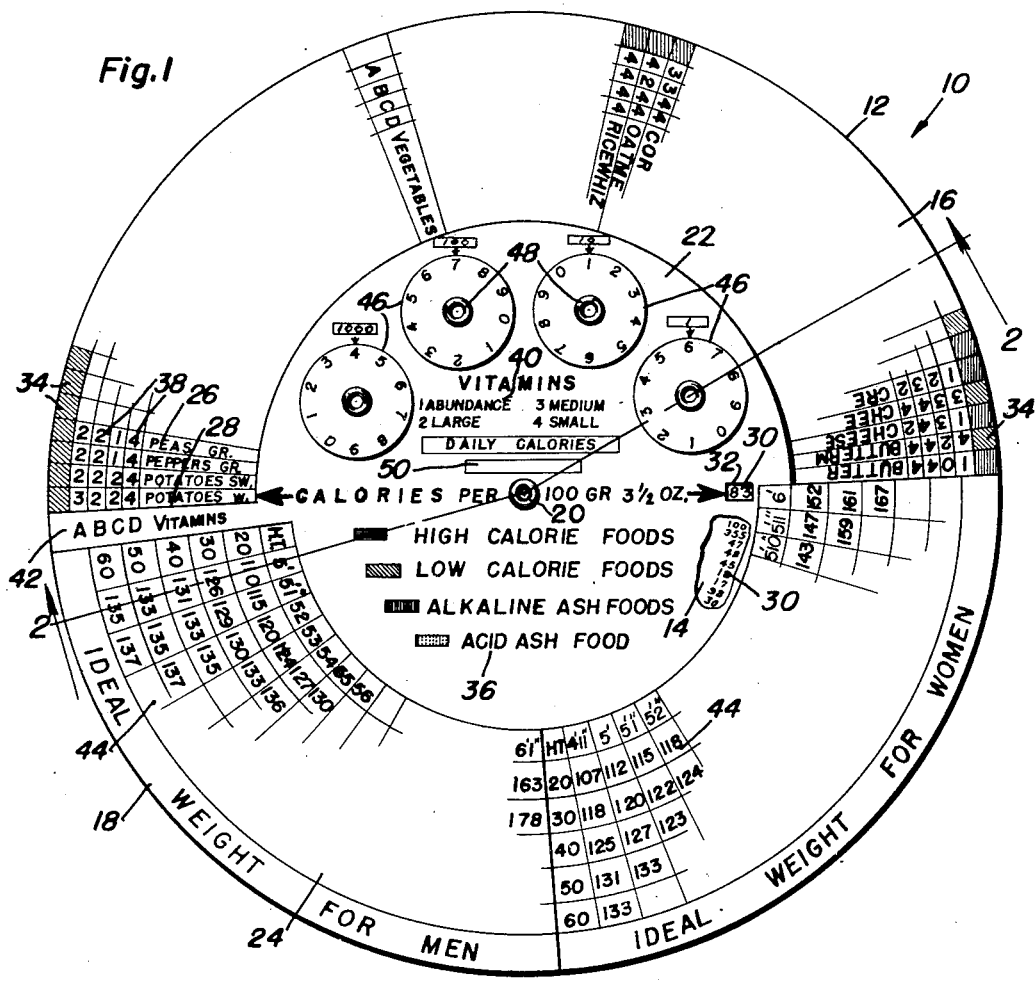
Figure 1 is a top plan view of the invention.
Figure 2:
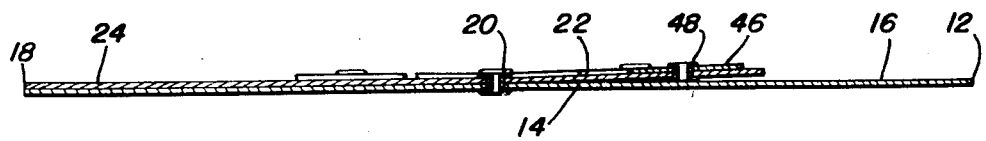
Figure 2 is a transverse sectional view, taken substantially in the plane of the line 2—2 in Figure 1.

Referring now to the accompanying drawings in detail, the invention consists of a nutrition indicator which is designated generally by the reference character 10 and embodies in its construction a circular base member 12 having a concentric circular center portion 14 and an annular outer portion 16, while a rotatable top member 18 is pivoted centrally by an eyelet 20 to the base member 12 and has a concentric circular center portion 22 and a substantially semi-circular outer portion 24.

The center portion 22 of the top member 18 is substantially co-extensive with the center portion 14 of the base member 12, while the outer portion 24 of the top member overlies the outer portion 16 of the base member.

The outer portion 16 of the base member is marked with radial and concentric lines to afford spaces for indicia 26 representing different types of foods, which indicia may be brought selectively in register with a radial edge 28 of the outer portion 24 of the top member. At the same time, indicia 30, provided on the center portion 14 of the base member, become selectively exposed in a window 32 in the center portion 20 of the top member to indicate the number of calories in a predetermined quantity of food indicated by the edge 28.

Also, for purposes of a cursory recognition of calorie value, the marginal region of the outer portion of the base member 12 may be provided with different colors 34 in alignment with the respective food indicia 26, the different values represented by the colors 34 being indexed as at 36 on the center portion 20 of the top member 18. In addition, numerical value indicia 38 may be provided on the outer portion 16 of the base member 12 in alignment with the respective food indicia 26, which may be read in accordance with their meaning as indicated in a legend 40 inscribed on the center portion 20, to indicate the abundance of vitamins as marked at 42 on the portion 24 adjacent to the edge 28.

The main portion 24 may be imprinted with conventional height and weight tables 44, while a plurality of rotatable dials 46 may be pivoted by eyelets 48, which dials upon rotation, may be set periodically during the day, to indicate to the user the amount of calories which, from time to time he has consumed.

Moreover, a space 50 may be provided in which the user may write the number of calories to be consumed daily.

It is believed that the advantages and use of the invention will be readily understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In a nutrition indicator of the class described, the combination of a circular base member having a concentric circular center portion with indicia thereon and an annular outer portion with indicia thereon, a rotatable top member pivoted centrally to said base member and including a circular center portion substantially coextensive with the center portion of the base member and a substantially semi-circular outer portion overlying the outer portion of said base member, the outer portion of the top member having at least one radial edge movable over the indicia on the outer portion of the base member and the center portion of the top member having a sight opening wherein to expose indicia on the center portion of the base member in predetermined relation to the indicia on the outer portion aligned with said radial edge.

HENRY P. ASKELI.

No references cited.